United States Patent
He (10) Patent No.: US 11,243,921 B2
(45) Date of Patent: Feb. 8, 2022

(54) DATABASE EXPANSION SYSTEM, EQUIPMENT, AND METHOD OF EXPANDING DATABASE (71) Applicants: Beijing Jingdong Shangke Information Technology Co., Ltd., Beijing (CN); Beijing Jingdong Century Trading Co., Ltd., Beijing (CN)

(72) Inventor: Gang He, Beijing (CN)

(73) Assignees: Beijing Jingdong Shangke Information Technology Co., Ltd., Beijing (CN); Beijing Jingdong Century Trading Co., Ltd., Beijing (CN)

(*) Notice: Subject to any disclaimer, the term of this patent is extended or adjusted under 35 U.S.C. 154(b) by 150 days.

(21) Appl. No.: 16/087,008

(22) PCT Filed: Jan. 6, 2017

(86) PCT No.: PCT/CN2017/070394
§ 371 (c)(1),
(2) Date: Sep. 20, 2018

(87) PCT Pub. No.: WO2017/161956
PCT Pub. Date: Sep. 28, 2017

(65) Prior Publication Data
US 2019/0108163 A1 Apr. 11, 2019

(30) Foreign Application Priority Data
Mar. 22, 2016 (CN) .......................... 201610166294.4

(51) Int. Cl.
G06F 7/00 (2006.01)
G06F 16/00 (2019.01)
G06F 16/21 (2019.01)
G06F 16/25 (2019.01)

(52) U.S. Cl.
CPC .......... *G06F 16/213* (2019.01); *G06F 16/217* (2019.01); *G06F 16/256* (2019.01)

(58) Field of Classification Search
None
See application file for complete search history.

(56) References Cited

U.S. PATENT DOCUMENTS

2009/0157802 A1* 6/2009 Kang .................... G06F 16/275
709/203
2011/0276579 A1* 11/2011 Colrain ................... H04L 67/32
707/756
(Continued)

FOREIGN PATENT DOCUMENTS

| CN | 101093502 A | 12/2007 |
|---|---|---|
| CN | 101187937 A | 5/2008 |

(Continued)

OTHER PUBLICATIONS

International Search Report for International Application No. PCT/CN2017/070394, dated Apr. 11, 2017, with English translation (6 pages).

(Continued)

*Primary Examiner* — Tuan A Pham
(74) *Attorney, Agent, or Firm* — Nixon Peabody LLP (57) ABSTRACT A database expansion system, equipment, and a method of expanding a database. The method includes: receiving modification information instructing to modify a mapping relationship between a virtual database and a database; reconfiguring according to the modification information the mapping relationship; receiving a database access request and analyzing the database access request to obtain information about a target virtual database; acquiring, according to the reconfigured mapping relationship, target database related information corresponding to the target virtual database; transmitting to a target database the database access (Continued)

request; and acquiring from the target database data corresponding to the database access request. The database expansion system, the equipment, and the method of expanding the database implement flexible capacity expansion of a database by mapping a virtual database to an expanded database, reducing an expansion cost, and maximally utilizing resources of a database server.

13 Claims, 4 Drawing Sheets

(56) References Cited

U.S. PATENT DOCUMENTS

| | | | | | |
|---|---|---|---|---|---|
| 2012/0158799 | A1* | 6/2012 | Morsi | ............. | G06F 16/21 707/812 |
| 2012/0323852 | A1* | 12/2012 | Jain | ............. | G06F 16/22 707/640 |
| 2015/0278334 | A1* | 10/2015 | Gerweck | ............. | G06F 16/283 707/706 |
| 2016/0063092 | A1* | 3/2016 | Roussey | ............. | G06F 16/22 707/812 |
| 2016/0092594 | A1* | 3/2016 | Deshmukh | ............. | G06F 16/24534 707/763 |
| 2016/0328462 | A1* | 11/2016 | Dinker | ............. | G06F 16/214 |

FOREIGN PATENT DOCUMENTS

| | | |
|---|---|---|
| CN | 102541990 A | 7/2012 |
| CN | 102722667 A | 10/2012 |
| CN | 102737127 A | 10/2012 |
| CN | 105335477 A | 2/2016 |

OTHER PUBLICATIONS

Written Opinion of International Searching Authority for International Application No. PCT/CN2017/070394, dated Apr. 11, 2017, with English translation (9 pages).

* cited by examiner

DATABASE EXPANSION SYSTEM, EQUIPMENT, AND METHOD OF EXPANDING DATABASE

CROSS-REFERENCE TO RELATED APPLICATIONS

This application is a U.S. National Stage of International Application No. PCT/CN2017/070394, filed on Jan. 6, 2017, which claims priority to Chinese patent application No. 201610166294.4, filed on Mar. 22, 2016. Both of the aforementioned applications are hereby incorporated by reference in their entireties.

TECHNICAL FIELD

The present disclosure relates to the field of computer technology, and specifically to a system and device for expanding a database, and a method for expanding a database.

BACKGROUND

In the current Internet applications, due to the rapid service development and the surging user numbers, it is unavoidable to keep expanding the database. However, the database expansion inevitably leads to the modification of the applications, and sometimes to the modification of the data architectures. Because of the need to modify the applications, it is cumbersome and time-consuming to expand the database, and leading to high capacity expansion costs.

In the existing technologies, a large number of data servers are generally reserved in the initial stage of a project, to avoid the problems that are likely to be resulted from the database expansion. However, this will lead to serious waste of resources.

SUMMARY

An object of the present disclosure is to provide a system and device for expanding a database, and a method for expanding a database, to solve the technical problems mentioned in the Background section.

An aspect of the present disclosure provides a method for expanding a database. The method includes: receiving modification information instructing to modify a mapping relationship between a virtual database and a database; reconfiguring the mapping relationship based on the modification information; receiving a database access request and analyzing the database access request, to obtain information of a target virtual database; acquiring information associated with a target database corresponding to the target virtual database based on the reconfigured mapping relationship; transmitting the database access request to the target database; and acquiring data corresponding to the database access request from the target database. The target virtual database is the virtual database to be accessed by the database access request.

Optionally, the acquiring information associated with a target database corresponding to the target virtual database based on the reconfigured mapping relationship includes: acquiring database connection pool information of the target database.

Optionally, the transmitting the database access request to the target database includes: transmitting the database access request to the target database through Java database connectivity (JDBC) or open database connectivity (ODBC).

Optionally, the modification information includes an identifier of the target virtual database, and a database name, an IP address, or connection pool configuration information of the target database.

Another aspect of the present disclosure provides a device for expanding a database. The device for expanding a database includes: a communication module configured for receiving modification information instructing to modify a mapping relationship between a virtual database and a database; a mapping management module configured for reconfiguring the mapping relationship based on the modification information; a request analysis module configured for receiving a database access request and analyzing the database access request, to obtain information of a target virtual database, and acquiring information associated with a target database corresponding to the target virtual database from the mapping management module based on the reconfigured mapping relationship; and a database access module configured for transmitting the database access request to the target database, and acquiring data corresponding to the database access request from the target database. The target virtual database is the virtual database to be accessed by the database access request.

Optionally, the information associated with a target database corresponding to the target virtual database and acquired by the request analysis module includes database connection pool information of the target database.

Optionally, the database access module is further configured for: transmitting the database access request to the target database through Java database connectivity (JDBC) or open database connectivity (ODBC).

Optionally, the modification information includes an identifier of the target virtual database, and a database name, an IP address, or connection pool configuration information of the target database.

Optionally, the mapping management module is further configured for querying the mapping relationship.

Still another aspect of the disclosure provides a system for expanding a database. The system for expanding a database includes: the device for expanding a database; and a control module configured for receiving the modification information, and sending the modification information to the device for expanding a database corresponding to a virtual database specified in the modification information.

The system, device, and method for expanding a database according to the present disclosure realize flexible capacity expansion of the database by mapping the virtual database to the expanded database, overcome the defects of capacity expansion of the conventional database, such as high costs, high risks, and long duration, and can maximize the utilization of database server resources.

BRIEF DESCRIPTION OF THE DRAWINGS

By reading and referring to detailed description on the non-limiting embodiments in the following accompanying drawings, other features, objects and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
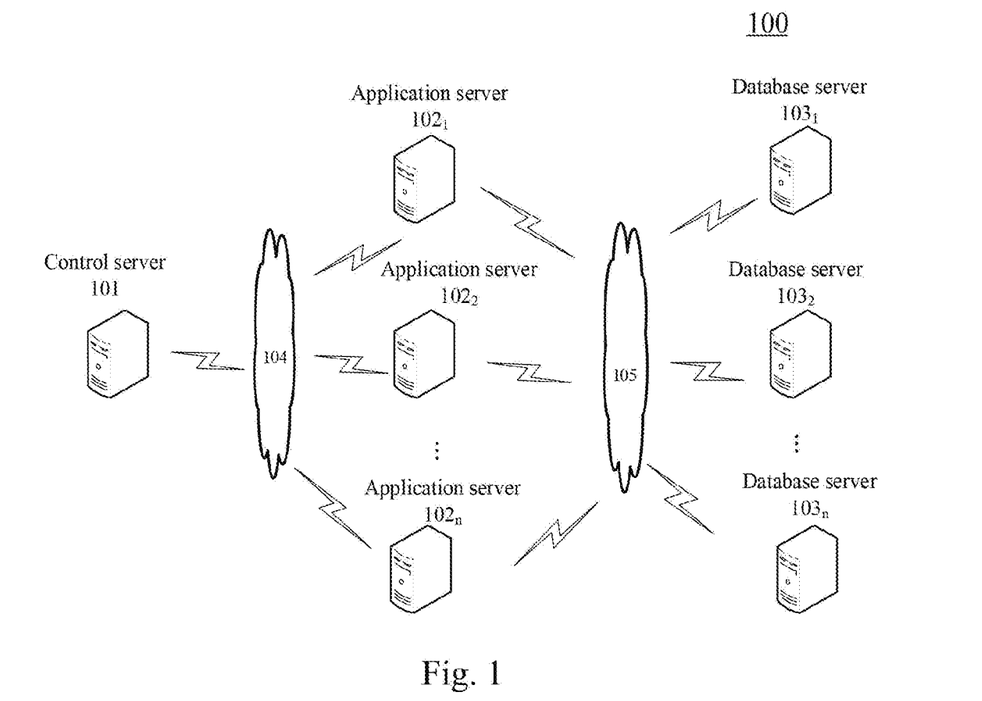
FIG. 1 is an architecture diagram of an exemplary system in which the present disclosure may be implemented.

FIG. 1 shows an exemplary system architecture 100 in which an embodiment of a system, device, or method for expanding a database according to the present disclosure may be implemented.

As shown in FIG. 1, the system architecture 100 may include a control server 101, application servers $102_1$-$102_n$, database servers $103_1$-$103_n$, and networks 104-105. The networks 104-105 respectively serve as a medium providing a communication link medium between the control server 101 and the application servers $102_1$-$102_n$, and a medium providing a communication link medium between the application servers $102_1$-$102_n$ and the database servers $103_1$-$103_n$. The network 104 may include a variety of connection types, such as a wired communication link, a wireless communication link, or a fiber cable.

The control server 101 is equipped with unlimited number of virtual databases, and is used for managing a mapping relationship from all virtual databases to databases in the database servers $103_1$-$103_n$. Each virtual database corresponds to an application server. That is, all database access requests sent by each application server are transmitted to a virtual database corresponding to the application server. The control server 101 is further configured with a control module. The control module is configured for receiving operation information (such as information for changing the mapping relationship between the virtual database and the database) inputted by a database administrator, and transmitting, based on identifier information of a virtual database included in the operation information, the operation information to an application server corresponding to the virtual database.

The application servers $102_1$-$102_n$ may be equipped with a variety of communication client-side applications, such as a web browser application, a shopping application, a search application, an instant messaging tool, an email client, and social platform software. When executing the applications on the application servers $102_1$-$102_n$, appropriate database servers $103_1$-$103_n$ as data sources of the application servers $102_1$-$102_n$ may be accessed through the network 105, and data as execution results of the applications may be received from the database servers $103_1$-$103_n$.

The control server 101, the application servers $102_1$-$102_n$, and the database servers $103_1$-$103_n$ may be a variety of electronic devices supporting database queries, including but not limited to desktop computers, tablet computers, laptop computers, or the like.

It should be noted that the method for expanding a database provided by the embodiment of the present disclosure is generally executed by the application servers $102_1$-$102_n$. Accordingly, the device for expanding a database is generally provided in the application servers $102_1$-$102_n$.

It should be understood that the numbers of application servers, networks, and database servers in FIG. 1 are only illustrative. There may be any number of application servers, networks, and database servers based on implementation needs.

As mentioned above, when executing an application on an application server, it is necessary to read data from a corresponding database server as a data source of the application server. Therefore, it is necessary to establish a data link between the application server and the database server. In the present disclosure, each application server 102 is equipped with a device 200 for expanding a database, to enable the database to achieve capacity expansion without affecting the application server running.

As an example, the device 200 for expanding a database configured in the application server $102_1$ according to the embodiment of the present disclosure is described hereinafter by referring to FIG. 2.

Figure 2:
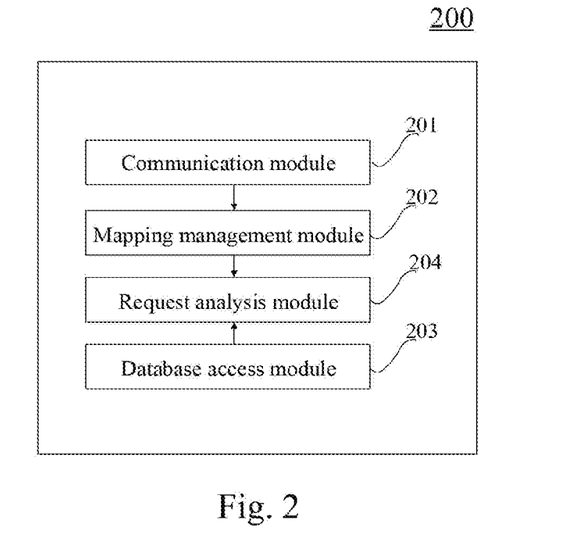
FIG. 2 shows a schematic diagram of a device for expanding a database according to an embodiment of the present disclosure.

As shown in FIG. 2, the device 200 for expanding a database includes a communication module 201, a mapping management module 202, a request analysis module 203, and a database access module 204.

The communication module 201 is used for communicating with the control server 101, to continuously synchronize a mapping relationship from a virtual database corresponding to an application server in which the communication module is located to a database from the control server 101.

When receiving modification information instructing to modify the mapping relationship from the virtual database to the database, the communication module 201 sends the modification information to the mapping management module 202.

Optionally, the modification information may include an identifier of the virtual database, and a database name, an IP address, or connection pool configuration information of a database corresponding to the virtual database.

The mapping management module 202 is used for managing a mapping relationship from a virtual database corresponding to an application server in which the mapping management module 202 is located to a database. When receiving the modification information from the communication module 201, the mapping management module 202 reconfigures the mapping relationship from the virtual database to the database based on the modification information, and stores the reconfigured mapping relationship.

Optionally, the mapping management module 202 may be further used for querying a mapping relationship between a virtual database and a database stored therein based on a specific query condition.

The request analysis module 203 is configured for receiving all database access requests of an application server in which the request analysis module 203 is located, and analyzing the received database access requests. The analysis result generally includes information (such as the identifier of the virtual database) of the virtual database to be accessed by the request (hereinafter referred to as the target virtual database). Furthermore, the request analysis module 203 further requests to the database mapping management module 202 information associated with a database (hereinafter referred to as the target database) corresponding to the virtual database, and submits the received database access request and the obtained information associated with the target database to the database access module 204.

In an embodiment of the present disclosure, the information associated with the target database acquired by the request analysis module 203 is the database connection pool information of the target database, such as maximum number of connections (maxConn), maximum waiting time (MaxWaitTime), and minimum number of connections (minConn).

The database access module 204 transmits the database access request from the request analysis module 203 to the target database, and acquires data corresponding to the database access request from the target database.

Optionally, the database access module 204 may send the database access request to the target database through Java database connectivity (JDBC) or open database connectivity (ODBC).

A method for expanding a database according to the present disclosure is described hereinafter by referring to FIG. 3.

Figure 3:
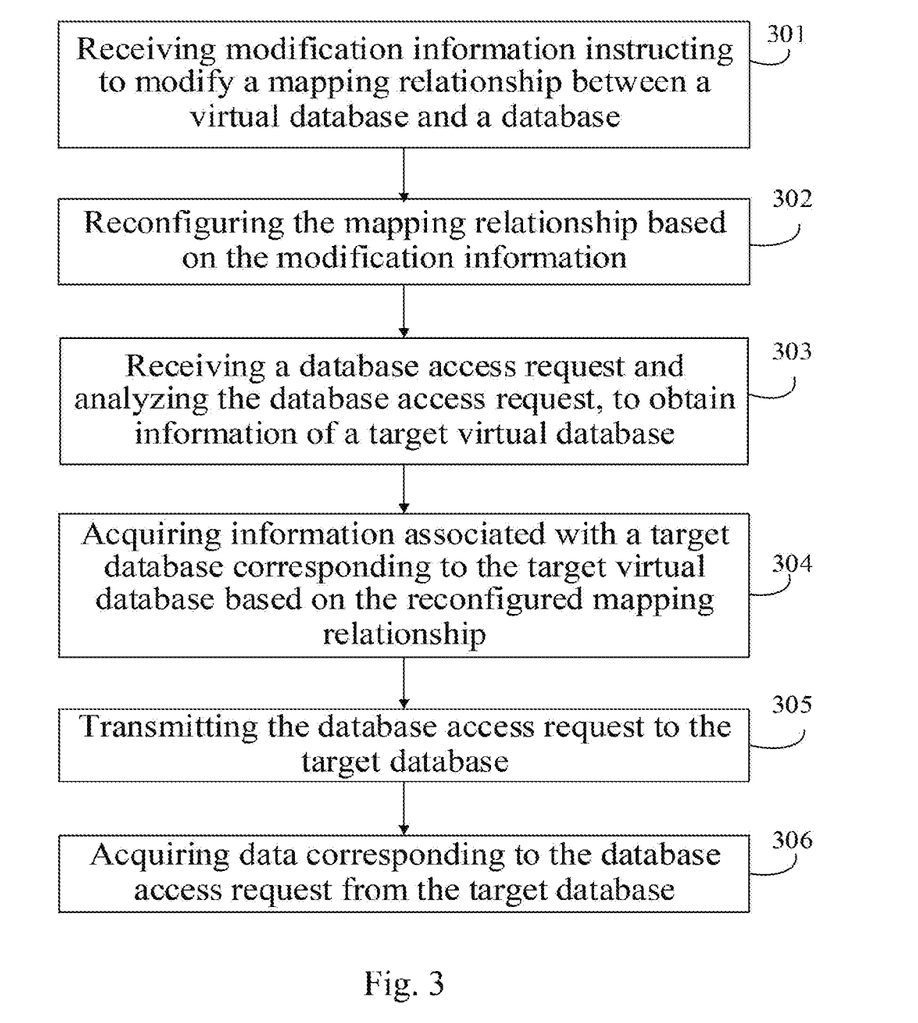
FIG. 3 shows a flowchart of a method for expanding a database according to an embodiment of the present disclosure.

As shown in FIG. 3, in step 301: receiving modification information instructing to modify a mapping relationship between a virtual database and a database.

In this step, the communication module 201 receives modification information inputted by a database administrator on the control server 101.

In an embodiment of the present disclosure, the modification information may include an identifier of the virtual database, and a database name, an IP address, or connection pool configuration information of a database corresponding to the virtual database for changing the mapping relationship.

Step 302: reconfiguring the mapping relationship between the virtual database and the database based on the received modification information.

It is assumed that the mapping relationship between the current virtual database and the database is as shown in Table 1. Virtual databases $V_1$-$V_3$ correspond to the application servers $102_1$-$102_3$ respectively, and databases $D_1$-$D_3$ are in the database server $103_1$.

TABLE 1

| Virtual database | Database |
|---|---|
| $V_1$ | $D_1$ |
| $V_2$ | $D_2$ |
| $V_3$ | $D_3$ |

If the modification information instructs to map the virtual databases $V_1$-$V_3$ to databases $D_4$-$D_6$ in the database server $103_2$, in this case, when receiving the modification information, the mapping management module of the device 200 for expanding a database in the application server $102_1$ remaps the virtual database $V_1$ to the database $D_4$. Similarly, when receiving the modification information, the mapping management module of the device 200 for expanding a database in the application server $102_2$ remaps the virtual database $V_2$ to the database $D_5$. When receiving the modification information, the mapping management module of the device 200 for expanding a database in the application server $102_3$ remaps the virtual database $V_3$ to the database $D_6$. Therefore, the reconfigured mapping relationship is as shown in Table 2.

TABLE 2

| Virtual database | Database |
|---|---|
| $V_1$ | $D_4$ |
| $V_2$ | $D_5$ |
| $V_3$ | $D_6$ |

Step 303: receiving a database access request and analyzing the received database access request, to obtain information of the virtual database included in the database access request.

After reconfiguring the mapping relationship between the virtual database and the database in the step 302, if the request analysis module 203 receives a database access request of an application server in which the request analysis module 203 is located, then the request analysis module analyzes information of the virtual database (hereinafter referred to as the target virtual database) included in the database access request, e.g., the identifier of the virtual database.

Step 304: acquiring information associated with a database (hereinafter referred to as the target database) corresponding to the target virtual database based on the reconfigured mapping relationship.

The request analysis module 203 requests information of the target database from the mapping module 202 based on the obtained information of the target virtual database. For example, in the above examples, if a database access request of the application server $102_1$ is received after reconfiguring the mapping relationship, then the request analysis module 203 in the device 200 for expanding a database of the application server $102_1$ knows the target virtual database being $V_1$ by analyzing the database access request, and then knows the target database being $D_4$ from Table 2. Thus, in this case, the request analysis module 203 may obtain information associated with the database $D_4$.

In an embodiment of the present disclosure, the information associated with the target database may be the database connection pool configuration information of the target database, such as maximum number of connections (maxConn), maximum waiting time (MaxWaitTime), and minimum number of connections (minConn).

Then, the request analysis module 203 sends the obtained information of the target database and the received database access request to the database access module 204.

Step 305: transmitting the received database access request to the target database.

The database access module 204 transmits the received database access request to the target database through Java database connectivity (JDBC) or open database connectivity (ODBC).

Step 306: acquiring data corresponding to the database access request from the target database.

The database access module 204 receives the database access result from the target database via a connection pool of the target database.

A sequence diagram of a method for expanding a database according to the present disclosure is described hereinafter by referring to FIG. 4.

Figure 4:
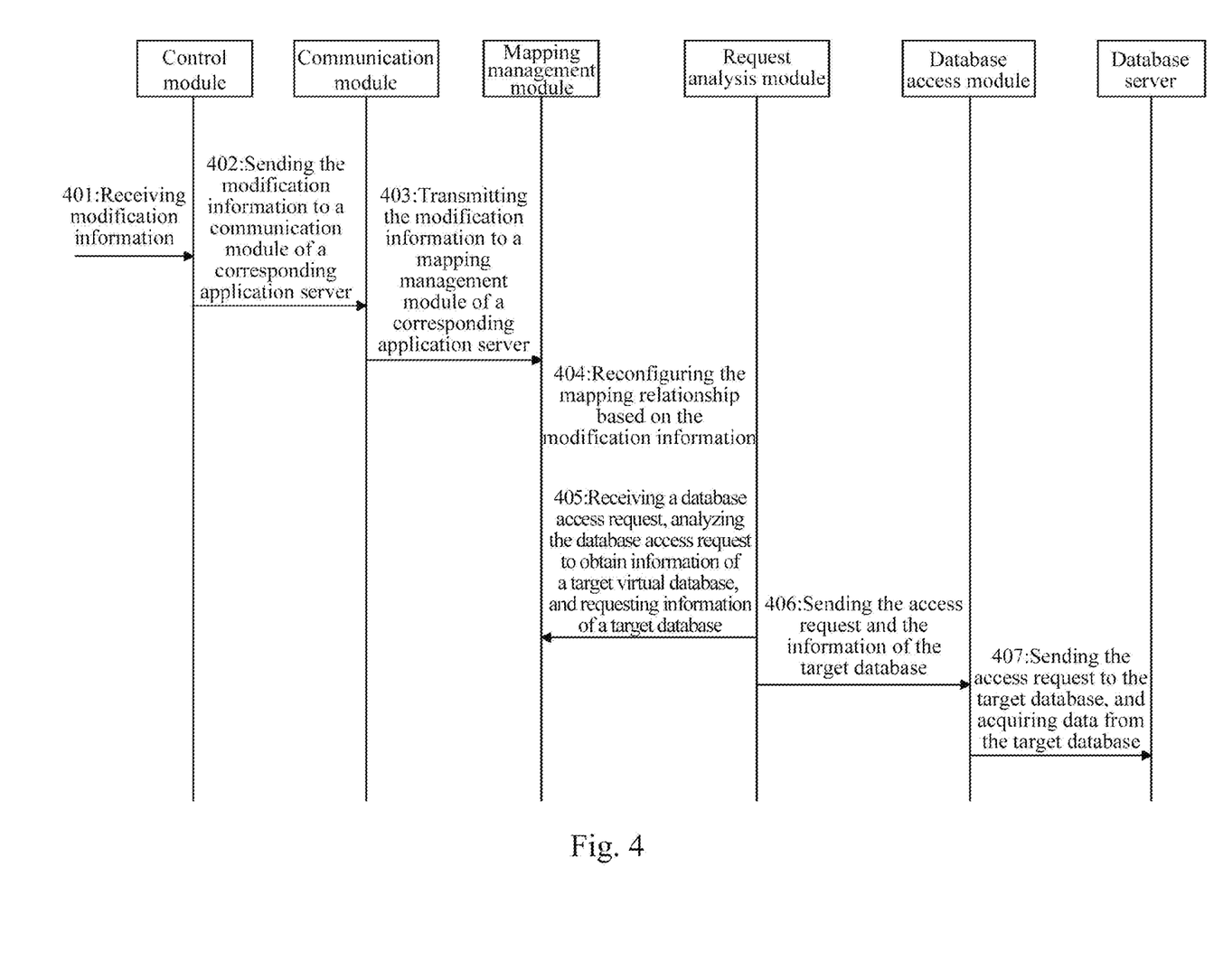
FIG. 4 shows a sequence diagram of the method for expanding a database according to an embodiment of the present disclosure.

As shown in FIG. 4, in step 401, a control module of the control server 101 receives modification information for changing the mapping relationship between the virtual database and the database inputted by a database administrator.

In step 402, the control module sends the received modification information to the communication module 201 of the device 200 in an application server corresponding to a virtual database specified in the modification information.

In step 403, the communication module 201 transmits the modification information to the mapping management module 202.

In step 404, the mapping management module 202 reconfigures the mapping relationship between the virtual database and the database based on the received modification information.

In step 405, the request analysis module 203 receives a database access request and analyzes the database access request, to obtain information of a target virtual database, and acquires information associated with a target database based on the reconfigured mapping relationship.

In step 406, the request analysis module 203 transmits the received database access request and the information of the target database to the database access module 204.

In step 407, the database access module 204 sends the access request to the target database, and acquires data corresponding to the database access request from the target database.

The system, device, and method for expanding a database according to the present disclosure realize flexible capacity expansion of the database by mapping the virtual database to the expanded database, overcome the defects of capacity expansion of the conventional database, such as high costs, high risks, and long duration, and can maximize the utilization of database server resources.

A structural schematic diagram of a computer system 500 adapted to implement a server according to an embodiment of the present disclosure is shown hereinafter by referring to FIG. 5.

Figure 5:
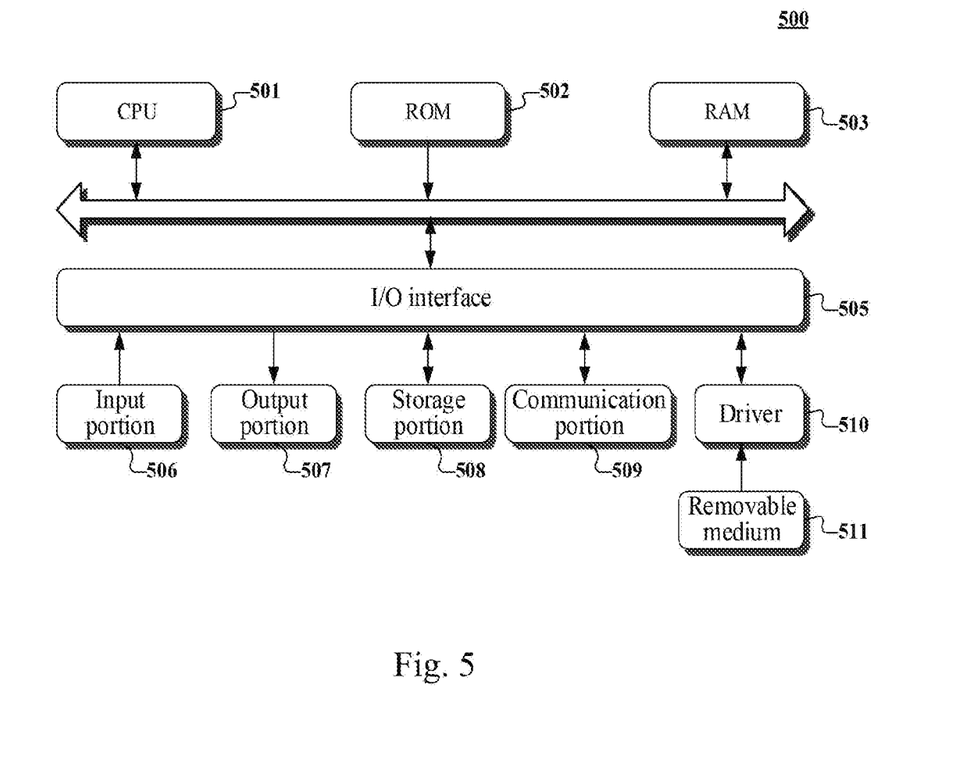
FIG. 5 is a structural schematic diagram of a computer system adapted to implement a system for expanding a database according to an embodiment of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 604.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure.

The units involved in the embodiments of the present disclosure may be implemented by means of software or hardware. The described units may also be provided in a processor, for example, described as: a processor, comprising a communication module, a mapping management module, a request analysis module and a database access module, where the names of these units do not in some cases constitute a limitation to such units themselves.

As another aspect, the present disclosure further provides a non-volatile computer storage medium. The non-volatile computer storage medium may be a non-volatile computer storage medium included in the apparatus in the above embodiments; and may also be a non-volatile computer storage medium that separately exists without being assembled into the terminal. One or more programs are stored in the non-volatile computer storage medium. The one or more programs, when executed by a device, cause the device to: receiving modification information instructing to modify a mapping relationship between a virtual database and a database; reconfiguring the mapping relationship based on the modification information; receiving a database access request and analyzing the database access request, to obtain information of a target virtual database; acquiring information associated with a target database corresponding to the target virtual database based on the reconfigured mapping relationship; transmitting the database access request to the target database; and acquiring data corresponding to the database access request from the target database. The target virtual database is the virtual database to be accessed by the database access request.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for expanding a database, comprising:
  receiving modification information instructing to modify a mapping relationship between a virtual database and a database, wherein in the mapping relationship, a first virtual database is mapped to a first database;
  reconfiguring the mapping relationship based on the modification information, wherein the reconfiguring the mapping relationship based on the modification information comprises: removing mapping from the first virtual database to the first database, and mapping the first virtual database to a second database having a different capacity from the first database;
  receiving a database access request and analyzing the database access request, to obtain information of a target virtual database;

acquiring information associated with a target database corresponding to the target virtual database based on the reconfigured mapping relationship, wherein the information associated with the target database corresponding to the target virtual database comprises a maximum number of connections of the target database or a minimum number of connections of the target database;

transmitting the database access request to the target database; and acquiring data corresponding to the database access request from the target database, the target virtual database being the virtual database to be accessed by the database access request.

2. The method according to claim 1, wherein the acquiring information associated with a target database corresponding to the target virtual database based on the reconfigured mapping relationship comprises:
   acquiring database connection pool information of the target database.

3. The method according to claim 1, wherein the transmitting the database access request to the target database comprises:
   transmitting the database access request to the target database through Java database connectivity (JDBC) or open database connectivity (ODBC).

4. The method according to claim 1, wherein the modification information comprises an identifier of the target virtual database, and a database name, an IP address, or connection pool configuration information of the target database.

5. The method according to claim 1, wherein the first virtual database corresponds to an application server, and all database access requests sent by the application server are transmitted to the first virtual database corresponding to the application server, wherein one or more client-side applications are installed in the application server.

6. The method according to claim 1, wherein the information associated with the target database corresponding to the target virtual database comprises the maximum number of connections of the target database, the minimum number of connections of the target database and maximum waiting time of the target database.

7. A device for expanding a database, comprising:
   at least one processor; and
   a memory storing instructions, the instructions when executed by the at least one processor, cause the at least one processor to perform operations, the operations comprising:
   receiving modification information instructing to modify a mapping relationship between a virtual database and a database, wherein in the mapping relationship, a first virtual database is mapped to a first database;
   reconfiguring the mapping relationship based on the modification information, wherein the reconfiguring the mapping relationship based on the modification information comprises: removing mapping from the first virtual database to the first database, and mapping the first virtual database to a second database having a different capacity from the first database;
   receiving a database access request and analyzing the database access request, to obtain information of a target virtual database, and acquiring information associated with a target database corresponding to the target virtual database based on the reconfigured mapping relationship, wherein the information associated with the target database corresponding to the target virtual database comprises a maximum number of connections of the target database or a minimum number of connections of the target database; and transmitting the database access request to the target database, and acquiring data corresponding to the database access request from the target database, the target virtual database being the virtual database to be accessed by the database access request.

8. The device according to claim 7, wherein the information associated with a target database corresponding to the target virtual database comprises database connection pool information of the target database.

9. The device according to claim 7, wherein the transmitting the database access request to the target database comprises:
   transmitting the database access request to the target database through Java database connectivity (JDBC) or open database connectivity (ODBC).

10. The device according to claim 7, wherein the modification information comprises an identifier of the target virtual database, and a database name, an IP address, or connection pool configuration information of the target database.

11. The device according to claim 7, wherein the operations further comprising: querying the mapping relationship.

12. A system for expanding a database, comprising:
   the device for expanding a database according to claim 7; and
   a control module configured for receiving the modification information, and sending the modification information to the device for expanding a database corresponding to a virtual database specified in the modification information.

13. A non-volatile computer storage medium, the computer storage medium storing a computer readable instruction executable by a processor, the computer readable instruction, when executed by the processor, causing the processor to perform operations, the operations comprising:
   receiving modification information instructing to modify a mapping relationship between a virtual database and a database, wherein in the mapping relationship, a first virtual database is mapped to a first database;
   reconfiguring the mapping relationship based on the modification information, wherein the reconfiguring the mapping relationship based on the modification information comprises: removing mapping from the first virtual database to the first database, and mapping the first virtual database to a second database having a different capacity from the first database;
   receiving a database access request and analyzing the database access request, to obtain information of a target virtual database;
   acquiring information associated with a target database corresponding to the target virtual database based on the reconfigured mapping relationship, wherein the information associated with the target database corresponding to the target virtual database comprises a maximum number of connections of the target database or a minimum number of connections of the target database;
   transmitting the database access request to the target database; and
   acquiring data corresponding to the database access request from the target database, the target virtual database being the virtual database to be accessed by the database access request.

* * * * *